United States Patent
Chen et al.

(10) Patent No.: US 10,509,998 B2
(45) Date of Patent: Dec. 17, 2019

(54) MULTIPLICATION AND ADDITION DEVICE FOR MATRICES, NEURAL NETWORK COMPUTING DEVICE, AND METHOD

(71) Applicant: Shanghai Cambricon Information Technology Co., Ltd., Pudong New Area (CN)

(72) Inventors: Tianshi Chen, Pudong New Area (CN); Yimin Zhuang, Pudong New Area (CN); Qi Guo, Pudong New Area (CN); Shaoli Liu, Pudong New Area (CN); Yunji Chen, Pudong New Area (CN)

(73) Assignee: SHANGHAI CAMBRICON INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/440,257

(22) Filed: Jun. 13, 2019

(65) Prior Publication Data

US 2019/0311252 A1    Oct. 10, 2019

Related U.S. Application Data

(63) Continuation-in-part of application No. PCT/CN2017/116456, filed on Dec. 15, 2017.

(51) Int. Cl.
*G06N 3/063* (2006.01)
*G06F 7/544* (2006.01)
*G06F 17/16* (2006.01)

(52) U.S. Cl.
CPC ........... *G06N 3/063* (2013.01); *G06F 7/5443* (2013.01); *G06F 17/16* (2013.01)

(58) Field of Classification Search
CPC ........ G06N 3/063; G06F 17/16; G06F 7/5443
See application file for complete search history.

(56) References Cited

U.S. PATENT DOCUMENTS

2018/0373902 A1* 12/2018 Muralimanohar ...... G11C 11/15

OTHER PUBLICATIONS

Chen, et al., "A Small-Footprint Accelerator for Large-Scale Neural Networks", ACM Transactions on Computer Systems, vol. 33, No. 2, Article 6, May 2015, 27 pages.
Du, et al., "An Accelerator for High Efficient Vision Processing", IEEE Transactions on Computer-aided Design of Integrated Circuits and System, vol. 36, No. 2, Feb. 2017, pp. 227-240.

(Continued)

*Primary Examiner* — Robert A Cassity
*Assistant Examiner* — Joseph V Nguyen

(57) ABSTRACT

Aspects of a neural network operation device are described herein. The aspects may include a matrix element storage module configured to receive a first matrix that includes one or more first values, each of the first values being represented in a sequence that includes one or more bits. The matrix element storage module may be further configured to respectively store the one or more bits in one or more storage spaces in accordance with positions of the bits in the sequence. The aspects may further include a numeric operation module configured to calculate an intermediate result for each storage space based on one or more second values in a second matrix and an accumulation module configured to sum the intermediate results to generate an output value.

20 Claims, 5 Drawing Sheets

(56) References Cited

OTHER PUBLICATIONS

Liu, et al., "Cambricon: An Instruction Set Architecture for Neural Networks", 2016 ACM/IEEE 43rd Annual International Symposium on Computer Architecture, Oct. 12, 2016, pp. 393-405.

Zhang, et al., "Cambricon-X An Accelerator for Sparse Neural Networks", The 49th Annual IEEE/ACM International Symposium on Microarchitecture Article No. 20, Oct. 15, 2016, 12 pages.

Chen, et al., "DaDianNao: A Machine-Learning Supercomputer", 2014 47th Annual IEEE/ACM International Symposium on Microarchitecture, Dec. 13, 2014, pp. 609-622.

Luo, et al., "DaDianNao: A Neural Network Supercomputer", IEEE Transaction on Computers, vol. 66, No. 1, Jan. 2017, pp. 73-88.

Chen, et al., "DianNao: A Small-Footprint High-Throughput Accelerator for Ubiquitous Machine-Learning", ASPLOS 14, Proceedings of the 19th international conference on Architectural Support for Programming Languages and Operating Systems, Mar. 1-5, 2014, pp. 269-283.

Chen, et al., "DianNao Family: Energy-Efficient Hardware Accelerators for Machine Learning", Communications of he ACM, vol. 59, No. 11, Nov. 2016, pp. 105-112.

Liu, et al., "PuDianNao: A Polyvalent Machine Leaming Accelerator", ASPLOS '15 Proceedings of the Twentieth International Conference on Architectural Support for Programming Languages and Operating Systems, Mar. 14-18, 2015, pp. 369-381.

Du, et al., "ShiDianNao: Shifting Vision Processing Closer to the Sensor", ISCA '15 Proceedings of the 42nd Annual International Symposium on Computer Architecture, Jun. 13-17, 2015, pp. 92-104.

* cited by examiner

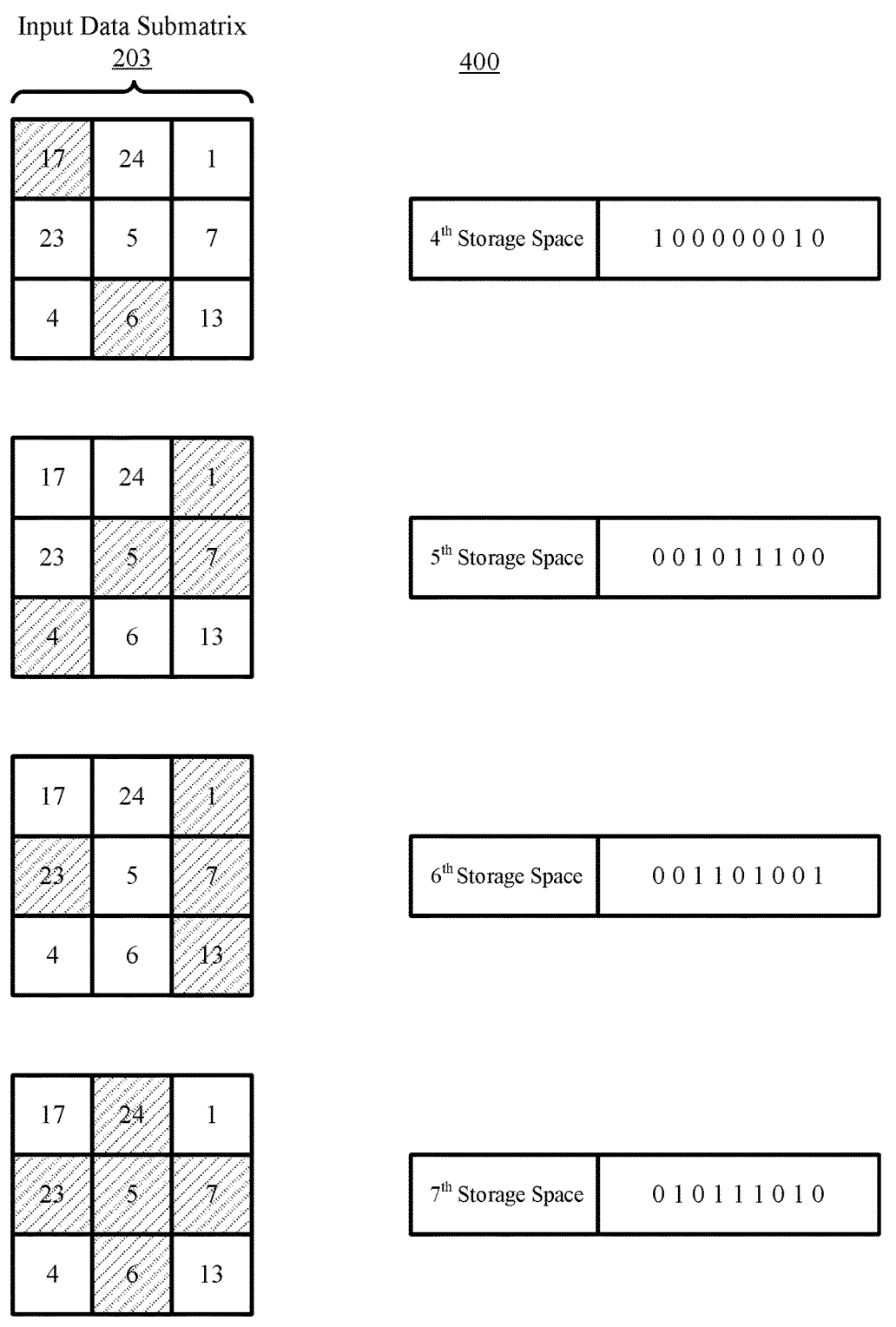

Input Data Submatrix
203

| 17 | 24 | 1 |
| 23 | 5 | 7 |
| 4 | 6 | 13 |

400

| 4th Storage Space | 1 0 0 0 0 0 0 1 0 |

| 17 | 24 | 1 |
| 23 | 5 | 7 |
| 4 | 6 | 13 |

| 5th Storage Space | 0 0 1 0 1 1 1 0 0 |

| 17 | 24 | 1 |
| 23 | 5 | 7 |
| 4 | 6 | 13 |

| 6th Storage Space | 0 0 1 1 0 1 0 0 1 |

| 17 | 24 | 1 |
| 23 | 5 | 7 |
| 4 | 6 | 13 |

| 7th Storage Space | 0 1 0 1 1 1 0 1 0 |

Fig. 4

MULTIPLICATION AND ADDITION DEVICE FOR MATRICES, NEURAL NETWORK COMPUTING DEVICE, AND METHOD

BACKGROUND

Multilayer artificial neural networks are widely involved in pattern recognition, image processing, function approximation, optimality computation, etc. In order to adapt to the increasingly high task requirements, the size and the complexity of the neural network are increasing. For example, a large convolution neural network may include hundreds of layers of operations. Particularly in convolution neural networks, large amount of convolution operations may reduce the processing speed of the neural network, which may further impair the practical applications of neural networks.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example neural network operation device. The example neural network operation device may include a matrix element storage module configured to receive a first matrix that includes one or more first values, wherein each of the one or more first values is represented as a sequence that includes one or more bits, and respectively store the one or more bits in one or more storage spaces in accordance with positions of the one or more bits in the sequence. Further, the example neural network operation device may include a numeric operation module configured to calculate an intermediate result for each storage space based on one or more second values in a second matrix, wherein the one or more second values correspond to non-zero values stored in the storage space. In addition, the example neural network operation device may include an accumulation module configured to sum the intermediate results to generate an output value.

Another example aspect of the present disclosure provides an example method for convolution in neural networks. The example method may include receiving, by a matrix element storage module, a first matrix that includes one or more first values, wherein each of the one or more first values is represented as a sequence that includes one or more bits; respectively storing, by the matrix element storage module, the one or more bits in one or more storage spaces in accordance with positions of the one or more bits in the sequence; calculating, by a numeric operation module, an intermediate result for each storage space based on one or more second values in a second matrix, wherein the one or more second values correspond to non-zero values stored in the storage space; and summing, by an accumulation module, the intermediate results to generate an output value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 illustrates another example sub-process of the example convolution process which may be performed by the example neural network system.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

In many examples of multilayer neural networks, convolution operations between input data and convolution kernels may be time consuming and lower the efficiency of the entire system. Typically, the input data and the convolution kernels may be formatted in matrices. A conventional convolution process may include multiple matrix multiplication operations that further includes multiplication operations. Multiplication operations, in general, may consume more computational resources than addition operations and shifting operations.

As such, replacing multiplication processors with adders and/or shifting modules may reduce power consumption and increase efficiency of the entire neural network system.

Figure 1:
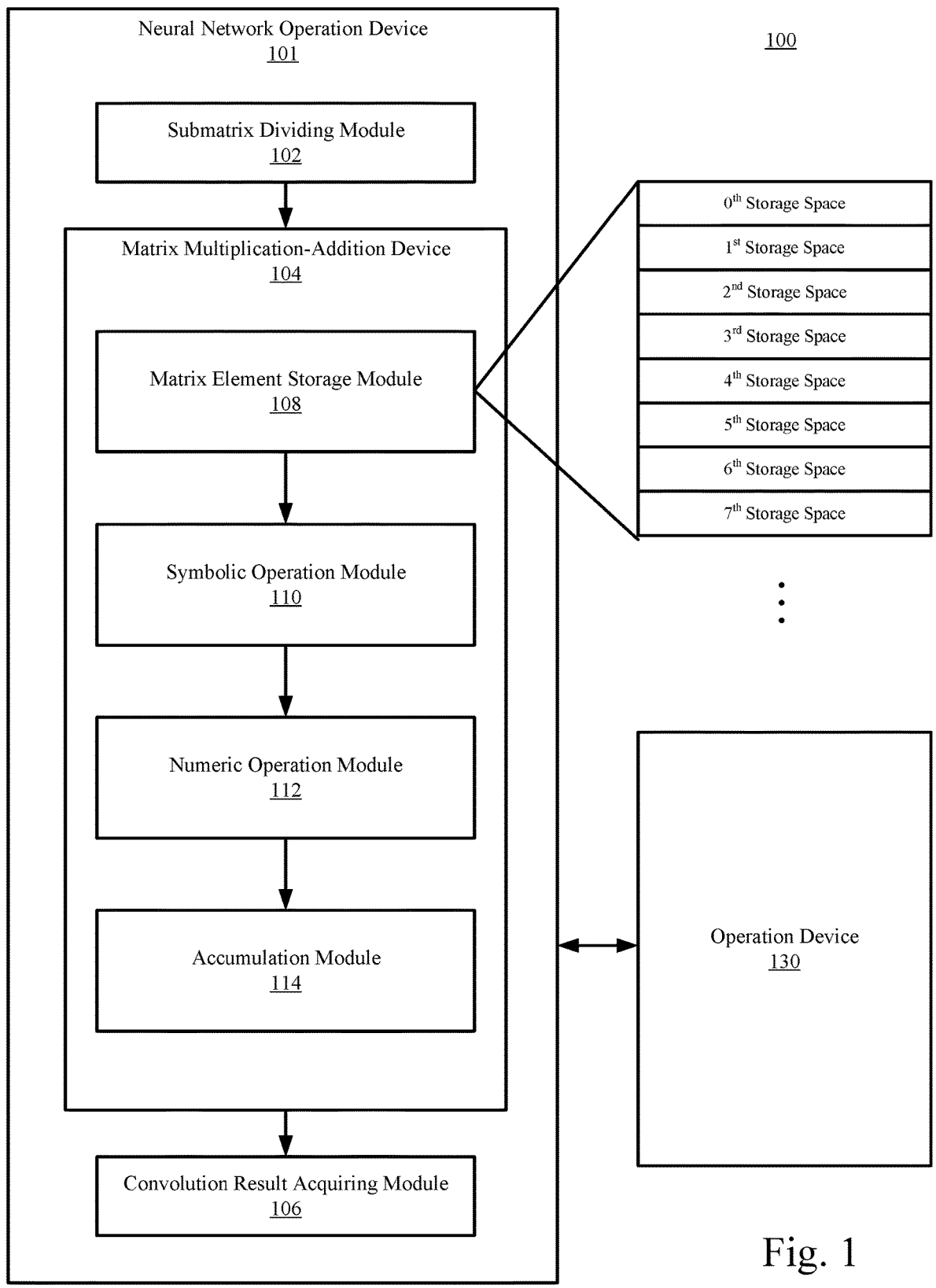
FIG. 1 illustrates a block diagram of an example neural network system in which convolution operations may be performed.

FIG. 1 illustrates a block diagram of an example neural network system 100 in which convolution operations may be performed. As depicted, the example neural network system 100 may include a neural network operation device 101 communicatively connected to an operation device 130. The operation device 130 may include one or more types of general-purpose/dedicated processors such as a central processing unit CPU, a graphics processing unit GPU, a neural network operation unit, etc. In some examples, the operation device 130 may serve as an interface between the neural network operation device and external data and control, including data transfer, to complete basic control such as starting and stopping of the neural network operation device. For example, the operation device 130 may be configured to transmit an instruction to initiate a convolution process to the neural network operation device 101.

In some examples, a convolution process may be performed between input data and a convolution kernel. Values included in the input data and the convolution kernel may be represented by fixed point numbers. Both the input data and the convolution kernel may be represented as matrices. In the context of neural network computing, the convolution kernel represented as a matrix may be referred to as a weight matrix interchangeably. In some examples, an input data matrix may correspond to a digital image that includes multiple pixels. Each of the pixels may correspond to an element in the input data matrix.

Upon receiving the instruction to initiate the convolution process from the operation device 130, the neural network operation device 101 may be configured to retrieve an input data matrix and the convolution kernel from a storage unit according to addresses included in the instruction.

Again, in the context of neural network computing, a size of the input data matrix may be greater than a size of the convolution kernel. Thus, the convolution process may include multiple matrix multiplication operations between the convolution kernel and different portions of the input data matrix. A submatrix dividing module 102 may be configured to select portions of the input data matrix as different submatrices for further processing. The submatrices may be referred to as input data submatrices hereinafter. This size of each input data submatrix is the same as the size of the convolution kernel. The input data submatrices and the convolution kernel may be transmitted to a matrix multiplication-addition device 104 for further operations. Operations between the input data submatrices and the convolution kernel may start from the first input data submatrix at the top left part of the input data matrix and continue to a next input data submatrix sequentially.

A matrix element storage module 108 of the matrix multiplication-addition device 104 may be configured to receive the input data submatrices and the convolution kernel. Each element in the input data submatrices and the convolution kernel may be formatted in one or more bits in a sequence, e.g., from the most significant bit (MSB) to the least significant bit (LSB). In some examples, an element may further include a sign bit that indicates a sign of the element, e.g., a zero at the sign bit may indicate that the element is positive. Thus, 8 may be represented as 00001000, in which the first bit from left is the sign bit, the second bit from left is the MSB and the first bit from right is the LSB.

Further, the matrix element storage module 108 may be configured to respectively store the one or more bits of the convolution kernel in different storage spaces according to the positions of the bits. For example, the sign bits of the elements in the convolution kernel may be stored in a storage space and the MSBs of the elements may be stored in another storage space. Similarly, other bits at the same position in the sequence may be stored in a same storage space.

A symbolic operation module 110 may be configured to perform an exclusive disjunction operation ("exclusive OR" or "XOR" operation) respectively between signs of the elements in a submatrix and the sign bits of the convolution kernel stored in a sign storage space. The result of the exclusive disjunction operation may also be represented as a binary result sequence. In some examples, the symbolic operation module 110 may be configured to respectively replace the signs of the elements in the input data submatrix 203 with the bits in the binary result sequence.

The matrix multiplication-addition device 104 may further include a numeric operation module 112 configured to identify one or more elements from the input data submatrix that correspond to the non-zero values in a storage space. The numeric operation module 112 may include one or more adders and/or one or more bitwise shifters. Further, the numeric operation module 112 may be further configured to sum the identified elements to generate a binary intermediate value and perform a bitwise shift to the binary intermediate value to generate an intermediate result. The bits to be shifted may be determined by the total number of the storage spaces and the position of the current storage space.

Since the process may be repeated for all storage spaces, one or more intermediate results may be generated. An accumulation module 114 of the matrix multiplication-addition device 104 may be configured to sum the intermediate results to generate an output value.

The output values generated for different input data submatrices may be transmitted to a convolution result acquiring module 106. The convolution result acquiring module 106 may be configured to assemble the output values to generate an output matrix as the result of the convolution operation. As described above, the convolution operation performed by the matrix multiplication-addition device 104 may replace multiplication processors with adders and bitwise shifters.

Figure 2:
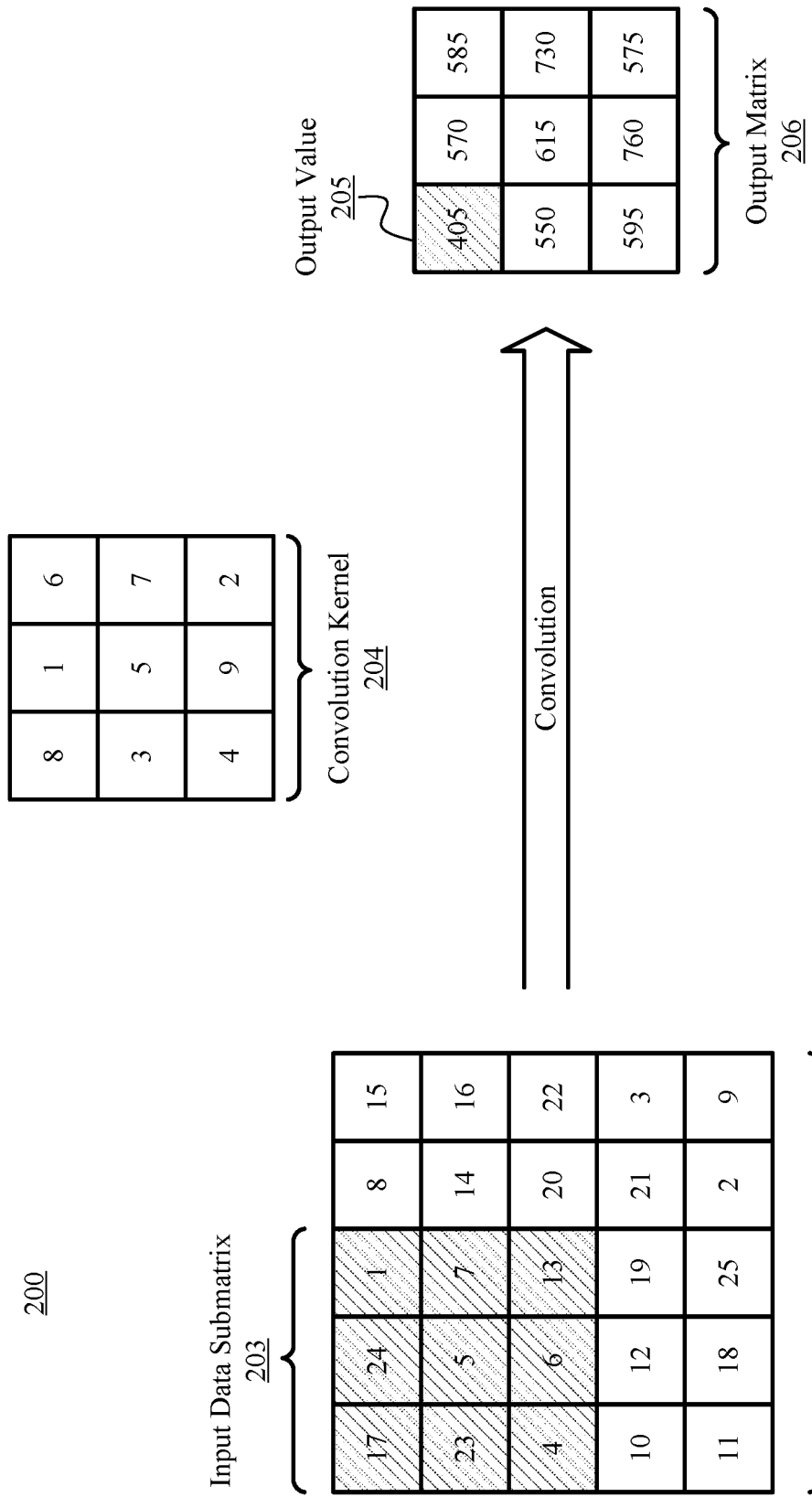
FIG. 2 illustrates an example convolution process which may be performed by the example neural network system.

FIG. 2 illustrates an example convolution process 200 which may be performed by the example neural network system. The example convolution process 200 may be performed by the components described in accordance with FIG. 1.

Upon receiving a convolution kernel 204 and an input data matrix 202, the submatrix dividing module 102 may be configured to select portions of the input data matrix 202 as the submatrices. For example, the first input data submatrix 203 may be the top left portion of the input data matrix 202, e.g., $$\begin{bmatrix} 17 & 24 & 1 \\ 23 & 5 & 7 \\ 4 & 6 & 13 \end{bmatrix}.$$

The second submatrix may be determined by horizontally moving the size of the convolution kernel 204 by one element, e.g., $$\begin{bmatrix} 24 & 1 & 8 \\ 5 & 7 & 14 \\ 6 & 13 & 20 \end{bmatrix}.$$

Thus, nine submatrices may be selected as the input data submatrices for further operations.

The matrix multiplication-addition device 104 may be configured to process the input data submatrix 203 and the convolution kernel 204 to generate an output value 205. Multiple output values generated with respect to different input data submatrices may be assembled by the convolution result acquiring module 106 to generate the output matrix 206. The processing at the matrix multiplication-addition device 104 may be described in greater detail in accordance with FIGS. 3-5.

Figure 3:
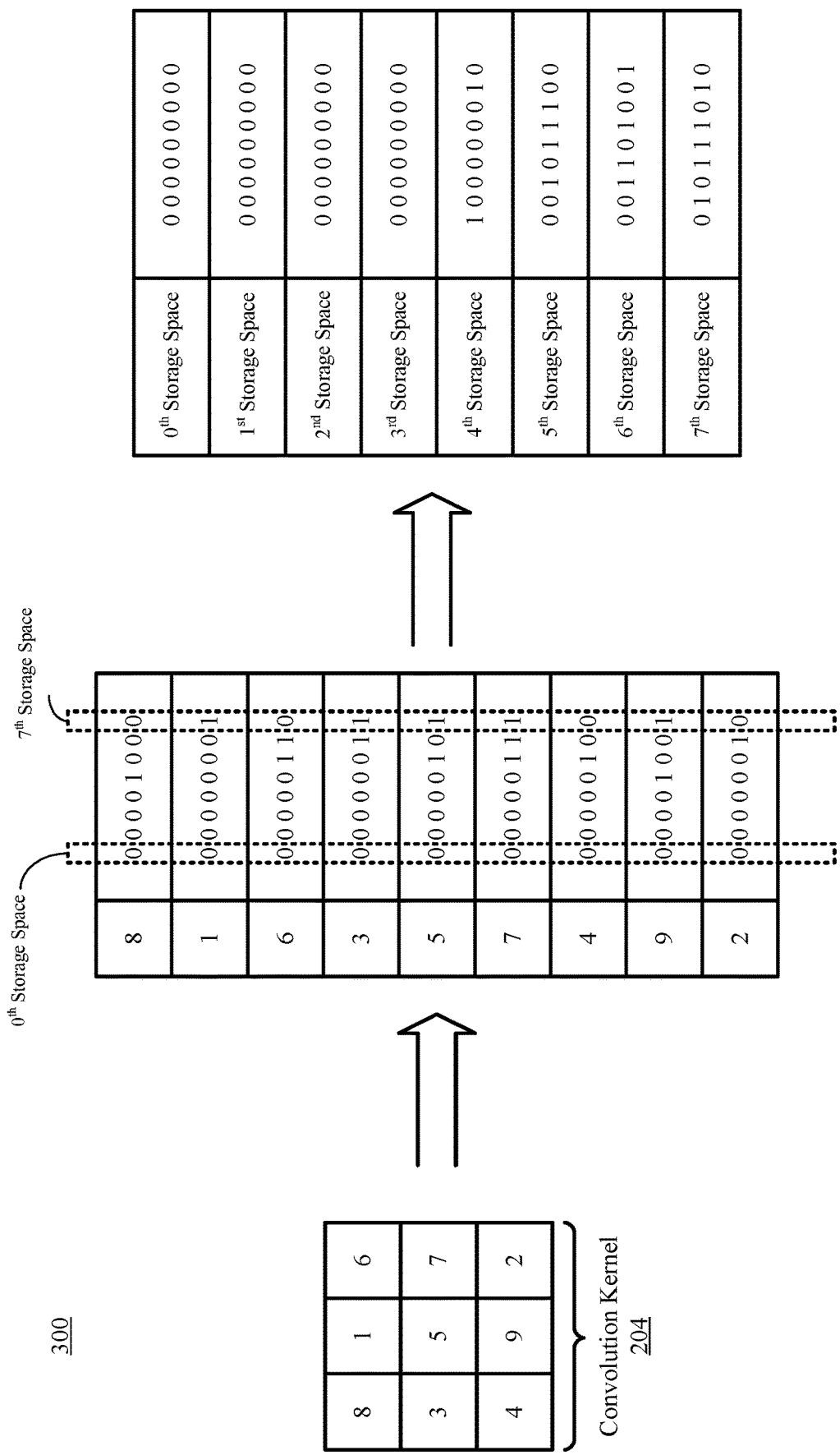
FIG. 3 illustrates an example sub-process of the example convolution process which may be performed by the example neural network system.

FIG. 3 illustrates an example sub-process 300 of the example convolution process which may be performed by the example neural network system. As described above, the matrix element storage module 108 may be configured to respectively store the one or more bits of the convolution kernel in different storage spaces according to the positions of the bits.

In more detail, each element in the example convolution kernel 204 may be represented in a sequence of one or more bits that include a sign bit and one or more numeric bits. For example, 8 may be represented as 00001000, in which the first bit from the left represents the sign and other seven bits represent the numeric value in a binary form. Similarly, 1 may be represented as 00000001; 6 may be represented as 00000110; 3 may be represented as 00000011; etc.

In this example, the matrix element storage module 108 may be configured to store the sign bits of the elements in the convolution kernel 204 in a sign storage space (e.g., denoted as the $0^{th}$ storage space in FIG. 3). Since the nine elements in the convolution kernel 204 are all positive, the sign bits stored in the $0^{th}$ storage space are all zeroes. Similarly, the matrix element storage module 108 may be configured to store the MSBs of the elements in the convolution kernel 204 in the first storage space (e.g., denoted as the $1^{st}$ storage space in FIG. 3). Similarly, other bits at the same position may be stored by the matrix element storage module 108 in a same storage space. For example, the LSBs of the elements may be stored in the $7^{th}$ storage space. The storage spaces that store the numeric bits (e.g., $1^{st}$ storage space to $7^{th}$ storage space) may be referred to as numeric storage spaces.

In some examples, with respect to the sign storage space, the symbolic operation module 110 may be configured to perform an exclusive disjunction operation respectively between the bits in the sign storage space and signs of each input data submatrices, e.g., input data submatrix 203.

The result of the exclusive disjunction operation may also be represented as a binary result sequence. In some examples, the symbolic operation module 110 may be configured to respectively replace the signs of the elements in the input data submatrix 203 with the bits in the binary result sequence. The sub-process 300 may continue to the example sub-process 400 illustrated in accordance with FIG. 4.

FIG. 4 illustrates another example sub-process 400 of the example convolution process which may be performed by the example neural network system.

In some examples, the numeric operation module 112 may be configured to identify elements in the input data submatrix 203 that correspond to the non-zero values in the respectively storage spaces.

For example, as the first and the eighth elements from left in the $4^{th}$ storage space are non-zero, the numeric operation module 112 may be configured to identify the first element and the eighth element in the input data submatrix 203, e.g., 17 and 6.

Similarly, since the third, the fifth, the sixth, and the seventh elements from left in the $5^{th}$ storage space are non-zero, the numeric operation module 112 may be configured to identify the third, the fifth, the sixth, and the seventh elements in the input data submatrix 203, e.g., 1, 5, 7, and 4.

By the same token, the numeric operation module 112 may be configured to identify 1, 23, 7, and 13 from the input data submatrix 203 according to the 6th storage space and 24, 23, 5, 7, and 6 from the input data submatrix 203 according to the 7th storage space.

Further, the numeric operation module 112 may be configured to sum the identified elements to generate a binary intermediate value. For example, the numeric operation module 112 may generate a binary intermediate value of 23 for the $4^{th}$ storage space, a binary intermediate value of 17 for the $5^{th}$ storage space, a binary intermediate value of 44 for the $6^{th}$ storage space, and a binary intermediate value of 65 for the $7^{th}$ storage space.

Further still, the numeric operation module 112 may be configured to perform a bitwise left shift operation to the respective binary intermediate values to generate intermediate results. The number of bits to be shifted may be determined based on a difference between a total number of the numeric storage spaces and a position of the current numeric storage space.

Taking the $4^{th}$ storage space as an example, since the total number of the numeric storage spaces is 7, the numeric operation module 112 may be configured to shift the binary intermediate value calculated for the $4^{th}$ storage space (e.g., 23) three bits (7 minus 4) to the left to generate the intermediate result, e.g., 184.

With respect to the $5^{th}$ storage space, the numeric operation module 112 may be configured to shift the binary intermediate value calculated for the $5^{th}$ storage space (e.g., 17) two bits (7 minus 5) to the left to generate the intermediate result, e.g., 68.

With respect to the $6^{th}$ storage space, the numeric operation module 112 may be configured to shift the binary intermediate value calculated for the $6^{th}$ storage space (e.g., 44) one bit (7 minus 6) to the left to generate the intermediate result, e.g., 88.

With respect to the $7^{th}$ storage space, the numeric operation module 112 may be configured not to shift the binary intermediate value (e.g., 65) since the difference between the total number of the numeric storage spaces and the position of the current numeric storage space is zero.

The accumulation module 114 may be configured to sum the intermediate results generated with respect to the different storage space to generate the output value, e.g., 184+68+88+65=405. Thus, rather than implementing multiplication processors, the matrix multiplication-addition device 104 may be configured to perform the matrix multiplication process with adders and/or bitwise shifters.

Figure 5:
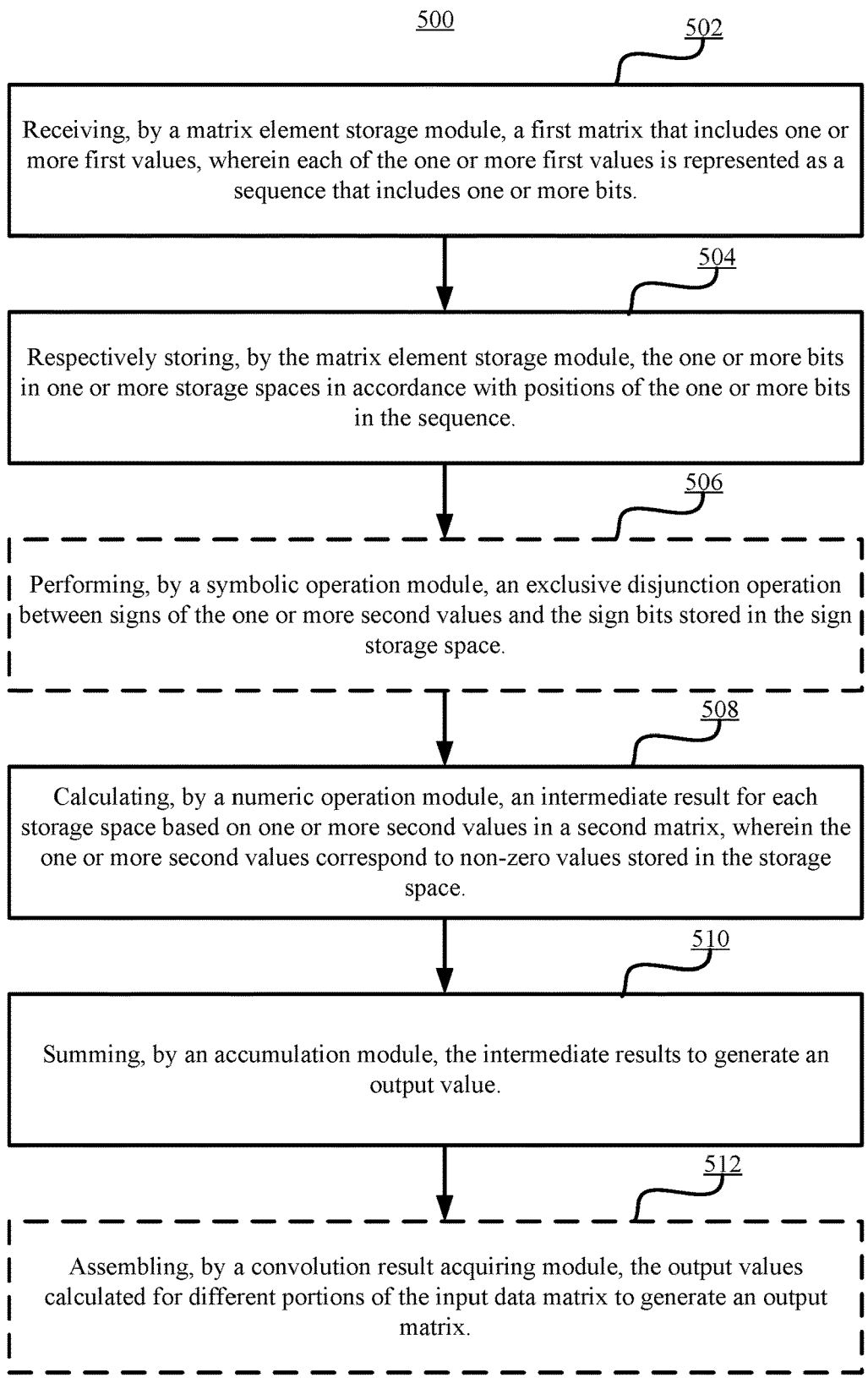
FIG. 5 illustrates a flow chart of an example method in which the example neural network system.

FIG. 5 illustrates a flow chart of an example method 500 in which the example neural network system. The example method 500 may be performed by the component described in accordance with FIG. 1. Dash-lined blocks may indicate optional operations of the example method 500.

At block 502, the example method 500 may include receiving, by a matrix element storage module, a first matrix that includes one or more first values, wherein each of the one or more first values is represented as a sequence that includes one or more bits. For example, the matrix element storage module 108 of the matrix multiplication-addition device 104 may be configured to receive the input data submatrices and the convolution kernel.

At block 504, the example method 500 may include respectively storing, by the matrix element storage module, the one or more bits in one or more storage spaces in accordance with positions of the one or more bits in the sequence. For example, the matrix element storage module 108 may be configured to respectively store the one or more bits of the convolution kernel in different storage spaces according to the positions of the bits. For example, the sign bits of the elements in the convolution kernel may be stored in a storage space and the MSBs of the elements may be stored in another storage space. Similarly, other bits at the same position in the sequence may be stored in a same storage space.

At block 506, the example method 500 may include performing, by a symbolic operation module, an exclusive disjunction operation between signs of the one or more second values and the sign bits stored in the sign storage space. For example, the symbolic operation module 110 may be configured to perform an exclusive disjunction operation ("exclusive OR" or "XOR" operation) between signs of the elements in a submatrix and the sign bits of the convolution kernel stored in a sign storage space.

At block 508, the example method 500 may include calculating, by a numeric operation module, an intermediate result for each storage space based on one or more second values in a second matrix, wherein the one or more second values correspond to non-zero values stored in the storage space. For example, the numeric operation module 112 configured to identify one or more elements from the input data submatrix that correspond to the non-zero values in a storage space. The numeric operation module 112 may include one or more adders and/or one or more bitwise shifters. Further, the numeric operation module 112 may be further configured to sum the identified elements to generate a binary intermediate value and perform a bitwise shift to the binary intermediate value to generate an intermediate result.

At block 510, the example method 500 may include summing, by an accumulation module, the intermediate results to generate an output value. For example, the accumulation module 114 of the matrix multiplication-addition device 104 may be configured to sum the intermediate results to generate an output value.

At block 512, the example method 500 may include assembling, by a convolution result acquiring module, the output values calculated for different portions of the input data matrix to generate an output matrix. For example, the convolution result acquiring module 106 may be configured to assemble the output values to generate an output matrix as the result of the convolution operation.

The process or method described in the above accompanying figures can be performed by process logic including hardware (for example, circuit, specific logic etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A neural network operation device, comprising:
   a matrix element memory configured to:
      receive a first matrix that includes one or more first values, wherein each of the one or more first values is represented as a sequence that includes one or more bits, and
      respectively store the one or more bits in one or more storage spaces in accordance with positions of the one or more bits in the sequence;
   a calculator circuit configured to calculate an intermediate result for each storage space based on one or more second values in a second matrix, wherein the one or more second values correspond to non-zero values stored in the storage space; and
   an accumulator circuit configured to sum the intermediate results to generate an output value.

2. The neural network operation device of claim 1, further comprising a submatrix divider circuit configured to select a portion of an input data matrix as the second matrix.

3. The neural network operation device of claim 1, wherein the one or more bits that represent each of the first values include a sign bit.

4. The neural network operation device of claim 3, wherein the sign bits of the first values are stored in a sign storage space.

5. The neural network operation device of claim 1, further comprising a convolution result assembler circuit configured to assemble the output values calculated for different portions of the input data matrix to generate an output matrix.

6. The neural network operation device of claim 1, wherein the one or more bits are arranged from a least significant bit (LSB) to a most significant bit (MSB) in the sequence.

7. The neural network operation device of claim 1, wherein the matrix element memory is further configured to:
   identify one of the one or more bits of each of the first values at the same position in the sequence, and
   store the identified bits at the same position in the sequence in the same storage space.

8. The neural network operation device of claim 1, wherein the calculator circuit is further configured to:
   sum the one or more second values in the second matrix that correspond to the non-zero values in one of the storage spaces to generate a binary intermediate value, and
   perform a bitwise shift operation to the binary intermediate value to generate the intermediate result corresponding to one of the storage spaces.

9. The neural network operation device of claim 4, further comprising a symbol calculator circuit configured to perform an exclusive disjunction operation between signs of the one or more second values and the sign bits stored in the sign storage space to generate a binary result sequence.

10. The neural network operation device of claim 9, wherein the symbol calculator circuit is further configured to respectively replace the signs of the one or more second values with elements in the binary result sequence.

11. A method for neural network operations, comprising:
   receiving, by a matrix element storage module, a first matrix that includes one or more first values, wherein each of the one or more first values is represented as a sequence that includes one or more bits;
   respectively storing, by the matrix element storage module, the one or more bits in one or more storage spaces in accordance with positions of the one or more bits in the sequence;
   calculating, by a numeric operation module, an intermediate result for each storage space based on one or more second values in a second matrix, wherein the one or more second values correspond to non-zero values stored in the storage space; and
   summing, by an accumulation module, the intermediate results to generate an output value.

12. The method of claim 11, further comprising selecting, by a submatrix dividing module, a portion of an input data matrix as the second matrix.

13. The method of claim 11, wherein the one or more bits that represent each of the first values include a sign bit.

14. The method of claim 13, wherein the sign bits of the first values are stored in a sign storage space.

15. The method of claim 11, further comprising assembling, by a convolution result acquiring module, the output values calculated for different portions of the input data matrix to generate an output matrix.

16. The method of claim 11, wherein the one or more bits are arranged from a least significant bit (LSB) to a most significant bit (MSB) in the sequence.

17. The method of claim 11, further comprising:
   identifying, by the matrix element storage module, one of the one or more bits of each of the first values at the same position in the sequence; and
   storing, by the matrix element storage module, the identified bits at the same position in the sequence in the same storage space.

18. The method of claim 11, further comprising:
   summing, by the numeric operation module, the one or more second values in the second matrix that correspond to the non-zero values in one of the storage spaces to generate a binary intermediate value, and
   performing, by the numeric operation module, a bitwise shift operation to the binary intermediate value to generate the intermediate result corresponding to one of the storage spaces.

19. The method of claim 14, further comprising performing, by a symbolic operation module, an exclusive disjunction operation between signs of the one or more second values and the sign bits stored in the sign storage space to generate a binary result sequence.

20. The method of claim 19, further comprising respectively replacing, by the symbolic operation module, the signs of the one or more second values with elements in the binary result sequence.

* * * * *